United States Patent Office 2,758,050
Patented Aug. 7, 1956

---

2,758,050

HYDRAZIDINE FUNGICIDAL AND BACTERICIDAL COMPOSITIONS AND METHODS

Johannes Thomas Hackmann, Amsterdam, Netherlands, assignor to Shell Development Company, Emeryville, Calif., a corporation of Delaware No Drawing. Application May 29, 1953,
Serial No. 358,539

13 Claims. (Cl. 167—30)

This invention relates to a pesticidal composition and to a method for combatting pests, particularly agricultural pests. More specifically, it relates to a composition and to a method for protecting plants from destruction by pests, particularly parasitic pathogens, such as fungi, bacteria, and the like.

In accordance with the present invention, it has been found that aromatic hydrazidines, particularly aromatic hydrazidines having less than 12 carbon atoms per molecule, are especially effective for use in combatting pests.

The preferred compounds for use in the present invention are the aromatic hydrazidines which satisfy the following general structural formula:

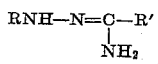

$$RNH-N=C-R'$$
$$\phantom{RNH-N=C-}|$$
$$\phantom{RNH-N=C}NH_2$$

wherein R is an aryl or aralkyl radical, preferably of not more than about 9 carbon atoms, and wherein R' is the residue of an acid selected from the group consisting of organic carboxylic acids and hydrocyanic acid.

Particularly suitable compounds are hydrazidines of the above formula in which R is the phenyl group, which compounds are called, generally, amidrazones. The most suitable amidrazones are those in which R' is the residue of a lower alkyl carboxylic acid wherein the alkyl group contains not more than 5 carbon atoms, an aminocarboxylic acid, such as carbamic acid, or hydrocyanic acid. Representative examples of this group of compounds are acetylamidrazone, propionylamidrazone, butyrylamidrazone, valeroylamidrazone, carbamylamidrazone (or formamidrazone) and cyanamidrazone. Other hydrazidine compounds which can be used include: acetyl benzyl hydrazidine, propionyl benzyl hydrazidine, butyryl benzyl hydrazidine, cyano benzyl hydrazidine, carbamyl benzl hydrazidine, acetyl tolyl hydrazidines, propionyl tolyl hydrazidines, cyano tolyl hydrazidines, carbamyl tolyl hydrazidines, acetyl zylyl hydrazidines, butyryl xylyl hydrazidines, carbamyl xylyl hydrazidines, acetyl ethylphenyl hydrazidines, carbamyl ethylphenyl hydrazidines, cyano ethylphenyl hydrazidines, acetyl phenylethyl hydrazidine, propionyl phenylethyl hydrazidine, butyryl phenylethyl hydrazidine, cyano phenylethyl hydrazidine, carbamyl phenylethyl hydrazidine, and the like.

Many of the compounds of the present invention have, in addition to an external action, an internal or systemic action; that is, they penetrate into the plants through which they spread, thereby rendering the plants immune or at least less susceptible to the attack of pests. Usually, the immunity lasts a few weeks, for instance, three weeks, after the substances have been absorbed by the plants. In many cases, the toxic agents have a curative effect if the plants are already affected. In many instances, such parts of the plants as develop after application of the systemic toxicant, such as new shoots, blades, flowers, fruits, etc., become immune for a certain period of time. Although the mechanism behind this systemic action is not clearly understood, it is believed that the systemic toxicants are converted to some other products within the living plants, the immunity and/or recovery being caused only by certain conversion products.

A systemic toxicant should be rapidly taken up by the plant; hence, the more water-soluble toxicants are preferred. In this application, solubility in water denotes a solubility of at least about 0.01% by weight at ambient temperatures. Solubility in water is known, generally, to decrease as the number of carbon atoms in the molecule increases. Therefore, with respect to water solubility, hydrazidine derivatives having not more than about 12 carbon atoms per molecule are preferred. Water solubility of hydrazidine derivatives having a greater number of carbon atoms per molecule can be enhanced by the introduction of water solubilizing groups, such as an —SO₃H group, into the hydrazidine compound.

The hydrazidine derivatives of this invention, being basic nitrogen compounds, can form salts with acids, particularly with inorganic mineral acids, such as hydrochloric acid and other hydrohalic acids, sulfuric acid, nitric acid, phosphoric acid, etc. The nitric and phosphoric acid salts of the hydrazidine derivatives of the present invention have been found to be particularly suitable for use as toxicants.

The hydrazidine derivatives need not be employed in a pure condition. Inactive materials in admixtures which have been formed in the commercial preparation thereof can be present. Mixtures of the toxic compounds as can be readily prepared from commercial products are also suitable.

The pesticidal agents of the invention can be used alone or in combination with other fungicidal, viricidal, insecticidal or acaricidal materials, the action of which may be either internal or external, with plant nutritives, with plant hormones, and the like. Wetting agents and, if necessary or desirable, stickers can be present. Any conventional wetting agent, for example, alkyl sulfate salts, alkyl aryl sulfonate salts, sulfosuccinate salts, ethers from polyethylene glycols and alkylated phenols, and the like can be employed. If the pesticidal agents are employed in the form of emulsions or suspensions, for example, in water, solvents such as oils, emulsifiers, emulsion stabilizers, and the like can be added. Materials which suppress the phytotoxic action of the pesticides, thereby making it possible to utilize unusually high dosages of the pesticidal material, can also be present. For example, glucose is known to protect tomato plants against damage by certain substances having a phytotoxic effect when in concentrated form, such as urea.

The pesticidal agents of the present invention can be effectively applied to the plant in various ways, as by (a) contacting parts of the plants above or in the soil therewith, (b) contacting the seed therewith, (c) introducing the agents into the soil near the roots of the plants, or (d) direct introduction of the agents into the plants, for example, through holes or incisions in parts of the plants. Application to parts of the plants above the soil by means of spraying has proved to be a particularly satisfactory method. When introducing the agents into the soil, care should be taken that the agents are introduced as near to the roots as possible and that sufficiently high concentrations be absorbed by the components of the soil since the agents might undergo a chemical or microbiological conversion before penetrating into the plants.

Spraying of the plants to be treated is preferably performed with aqueous solutions or suspensions of the pesticidal agent. Aqueous solutions or suspensions containing from about 0.01 to about 1% by weight, and preferably from about 0.1 to about 0.5% by weight, of the pesticidal agent are particularly suitable. Higher concentrations of the fungicidal agents can be employed if no phytotoxic effects are observed. As a rule, however, because of the danger of phytotoxicity, the use of low concentrations is recommended. If desired, a minor amount, of the order of from about 0.01 to about 0.05% by weight, of a wetting agent can be added to aid in forming a suspension of the active agent in the aqueous medium. Any of the conventional wetting agents, such as those mentioned above, can be employed. Particularly suitable wetting agents are the sodium salt of a mixture of secondary heptadecyl sulfates, sold commercially under the name of "Teepol," and the polyethylene glycols of alkyl phenols, sold commercially under the name of "Triton."

The substituted hydrazidines are particuarly effective for protecting plants from the attack of parasitic pathogens, some of the more important of which are listed in the table.

| Latin Name of the Pathogen | English Name of the Disease | Most Important Plants on Which the Disease May Occur |
| --- | --- | --- |
| Cladosporium fulvum | Leaf mould (tomato disease). | Tomato plants. |
| Septoria apii graveolentis | | Celery plants. |
| Phytophthora infestans | Late blight (potato disease). | Potato plants. |
| Colletotrichum Lindemuthianum. | Anthracnose | Brown kidney bean plants (Phaseolus vulgaris L.). |
| Exobasidium vexans | Blister blight | Tea plants. |
| Erysiphaceae (various species). | Mildew | Various plants, e. g., apple trees. |
| Uredinales (various species). | Rust | Corn species. |
| Fusarium (various species) | Wilt disease | Cucumber plants. |
| Ceratostomella ulmi | Dutch elm disease | Elm trees. |
| Pseudomonas (various species e. g., Agrobacterium tumefaciens). | Crown gall | Tomato and many other plants. |

All of the pathogens mentioned in the foregoing table are fungi, except the last which is a species of bacteria.

The activity of the toxic compounds of the present invention was, in general, determined by the following method:

Test plants were sprayed with an aqueous solution of the agent until the liquid dropped from the leaves. After the spray liquid dried, usually after about two days, the plants were exposed to contamination.

Depending on the kind of test plant and of the kind of fungus, contamination was effected either by inoculation of the plant or by placing the plant in contaminated surroundings, for example, in a greenhouse in which plants affected by the fungus were present. Conditions were such that the untreated plants soon became diseased. After a certain period had elapsed, depending on the plant tested, the ratio of the affected leaf surface to the total leaf surface was determined for both the treated and the untreated plants. The quantity obtained by subtracting the quotient of these two numbers from one is a measure for the degree to which suppression of the pathogen has succeeded. Hereinafter, this quantity, expressed in per cent, will be termed the degree of suppression. The degree of suppression was determined at a time at which the untreated plants showed clear symptoms of the disease. As a rule, the leaf surfaces were not measured, but estimated with the required accuracy. An experienced person can in this way determine the degree of suppression with an accuracy of about 5%. This accuracy is sufficient since, in general, results obtained in biological tests are only reproducible within rather wide limits.

The invention is illustrated by the following examples:

*Example I*

Two-month-old potato plants were sprayed until the liquid dropped from the leaves, with an aqueous solution containing 0.5% by weight of acetylamidrazone which has the following structural formula:

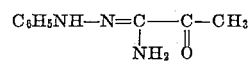

The plants were then infected with *Phytophthora infestans*. The degree of suppression obtained was 68%. With potato plants treated with a 0.75% suspension of copper oxychloride and then infected with Phytophthora, the degree of suppression was only 36%.

*Example II*

Two-month-old tomato plants were sprayed, until the liquid dropped from the leaves, with an aqueous solution containing 0.1% by weight of acetylamidrazone. The plants were then infected with *Phytophthora infestans*. The degree of suppression obtained was 82%. With tomato plants treated with a 0.75% suspension of copper oxychloride and then infected with Phytophthora, the degree of suppression was only 70%.

*Example III*

Rye infected with rust was sprayed with a 0.1%w aqueous solution of acetylamidrazone. The degree of suppression obtained was 88%.

*Example IV*

A series of apple seedlings (20 cms. tall) was sprayed with an aqueous solution containing 0.3% by weight of cyanamidrazone and 0.1% by weight of "Teepol" as a wetting agent. Cyanamidrazone has the following structural formula:

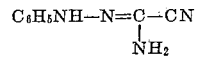

Eighty cubic centimeters were applied per square meter. Three days later, the plants were inoculated with spores of apple mildew. After three weeks, the degree to which the leaves (which had in the meantime unfolded at the top) were affected was observed. A degree of suppression of 80% was obtained.

*Example V*

Potato plants infected with *Phytophthora infestans* were sprayed with 0.5%w aqueous solutions of acetylamidrazone, cyanamidrazone and carbamylamidrazone, respectively. Carbamylamidrazone has the following structural formula:

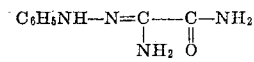

In each case, the degree of suppression obtained was about 80%.

The hydrazidine derivatives of the present invention are not only suitable for combatting plant diseases but are also suitable for combatting pests in general, and fungi in particular, which attack any predominantly organic material, for example, leather or textiles, or an organism, for example, a vegetable or animal organism.

I claim as my invention:

1. A method for protecting plants from destruction by parasitic pathogens which comprises applying to the plants acetylamidrazone.

2. A method for protecting plants from destruction by parasitic pathogens which comprises applying carbamylamidrazone to the locus of the plants.

3. A method for protecting plants from destruction by parasitic pathogens which comprises applying cyanamidrazone to the locus of the plants.

4. In a method for combatting parasitic pathogens, the application to the locus of plants of an acyl arylhydrazidine in which the acyl radical is the residue of an alkyl carboxylic acid in which the alkyl group contains not more than 5 carbon atoms.

5. In a method for combatting parasitic pathogens, the application to the locus of plants of an effective toxic amount of a carbamyl arylhydrazidine.

6. In a method for combatting parasitic pathogens, the application to the locus of plants of an effective toxic amount of a cyano arylhydrazidine.

7. A composition suitable for protecting plants from destruction by parasitic pathogens which comprises acetylamidrazone and a wetting agent in an aqueous medium.

8. A composition suitable for protecting plants from destruction by parasitic pathogens which comprises cyanamidrazone and a wetting agent in an aqueous medium.

9. A composition suitable for protecting plants from destruction by parasitic pathogens which comprises carbamylamidrazone and a wetting agent in an aqueous medium.

10. A composition suitable for protecting plants from destruction by parasitic pathogens which comprises an acyl amidrazone in which the acyl radical is the residue of an alkyl carboxylic acid in which the alkyl group contains not more than 5 carbon atoms, and a wetting agent in an aqueous medium.

11. A composition suitable for protecting plants from destruction by parasitic pathogens which comprises a carbamyl arylhydrazidine and a wetting agent in an aqueous medium.

12. A composition suitable for protecting plants from destruction by parasitic pathogens which comprises a cyano arylhydrazidine and a wetting agent in an aqueous medium.

13. In the method for combatting pests, the application to the locus of plants of hydrazidines which have the general formula

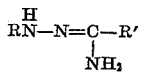

wherein R is selected from the group consisting of aryl and aralkyl radicals and R' is selected from the group consisting of acyl radicals having not more than 5 carbon atoms and the cyano radical, whereby the amount of parasitic pathogens on said plants is lowered.

References Cited in the file of this patent
Liebigs Annalen der Chemi, 1951, pages 85–98.